Sept. 25, 1923.

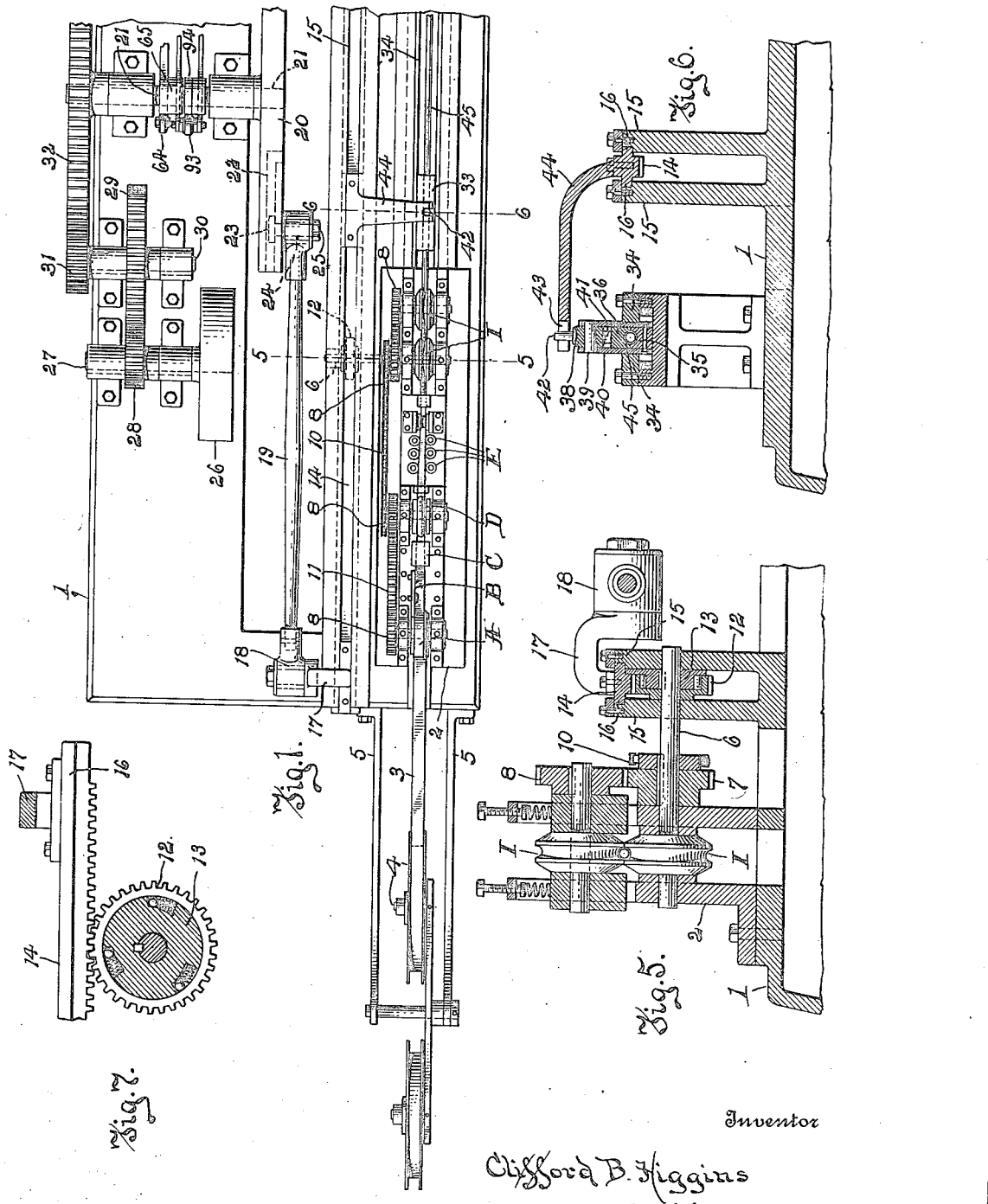

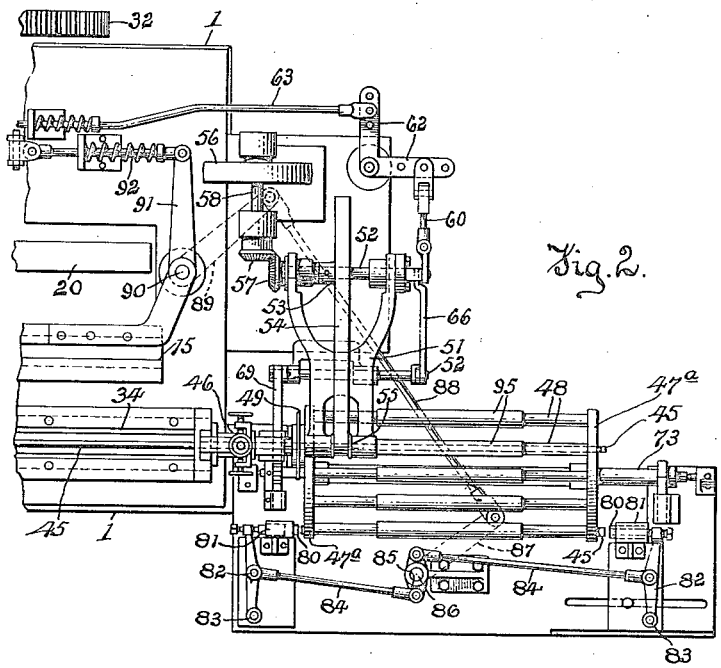
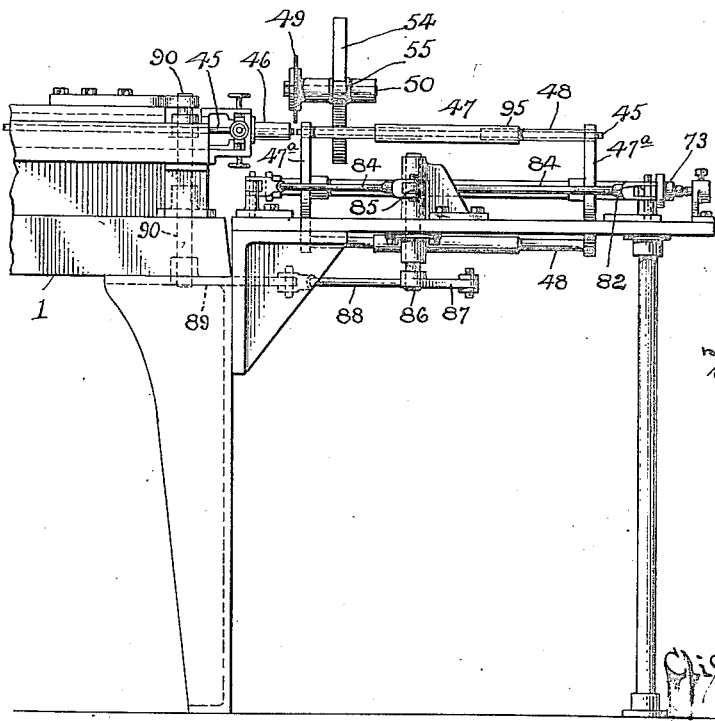

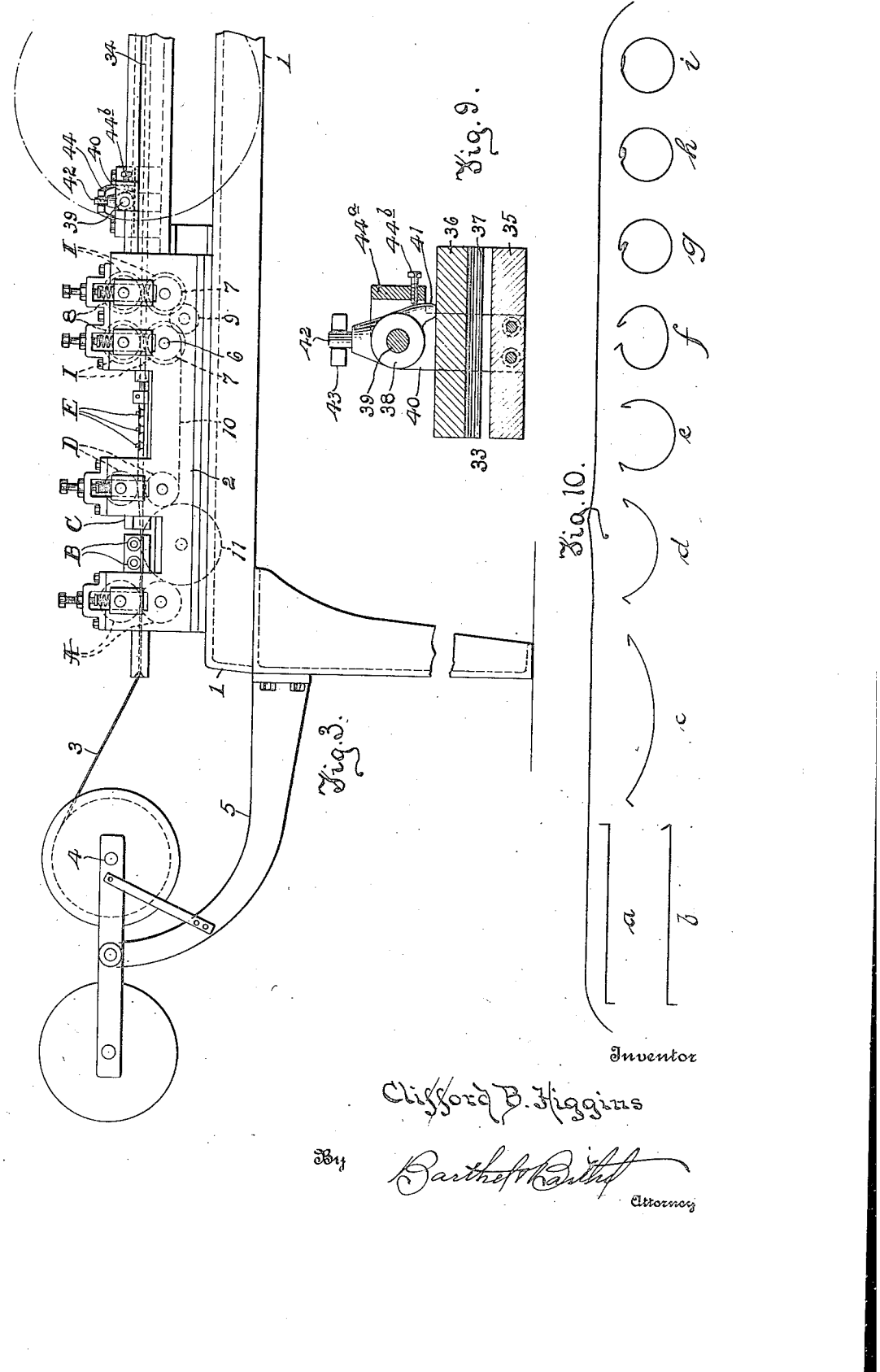

C. B. HIGGINS 1,468,635

TUBE FORMING MACHINE

Filed May 29, 1922

Inventor

Clifford B. Higgins

By

Attorney

Sept. 25, 1923.

C. B. HIGGINS

TUBE FORMING MACHINE

Filed May 29, 1922

Inventor
Clifford B. Higgins
By
Attorney

Patented Sept. 25, 1923.

1,468,635

UNITED STATES PATENT OFFICE.

CLIFFORD B. HIGGINS, OF DETROIT, MICHIGAN.

TUBE-FORMING MACHINE.

Application filed May 29, 1922. Serial No. 564,353.

*To all whom it may concern:*

Be it known that I, CLIFFORD B. HIGGINS, a citizen of the United States of America, residing at Detroit, in the county of Wayne and State of Michigan, have invented certain new and useful Improvements in Tube-Forming Machines, of which the following is a specification, reference being had therein to the accompanying drawings.

This invention relates to a machine for forming tubes from sheet metal and more particularly to lock-seam tubing formed from a ribbon of sheet metal.

The object of the present invention is to automatically produce finished tubes of desired length ready for assembly in motor vehicle radiators or other structures and to provide a machine for automatically producing such tubes, such machine having certain new and useful features in the construction, arrangement, and combination of parts, all as hereinafter more fully set forth.

With the above and other ends in view, the invention consists in the matters hereinafter set forth and more particularly pointed out in the appended claims, reference being had to the accompanying drawings in which Figs. 1 and 2 together show in plan view, a machine illustrative of the invention;

Figs. 3 and 4, a side elevation of the same;

Fig. 5 an enlarged sectional detail substantially upon the line 5—5 of Fig. 1;

Fig. 6 an enlarged sectional detail substantially upon the line 6—6 of Fig. 1;

Fig. 7 is a sectional detail of a rack and pinion;

Fig. 9 is an enlarged detail of a gripping block showing the same in longitudinal section;

Fig. 10 is a diagram illustrating the several steps in the operation of forming a tube;

Figure 8:
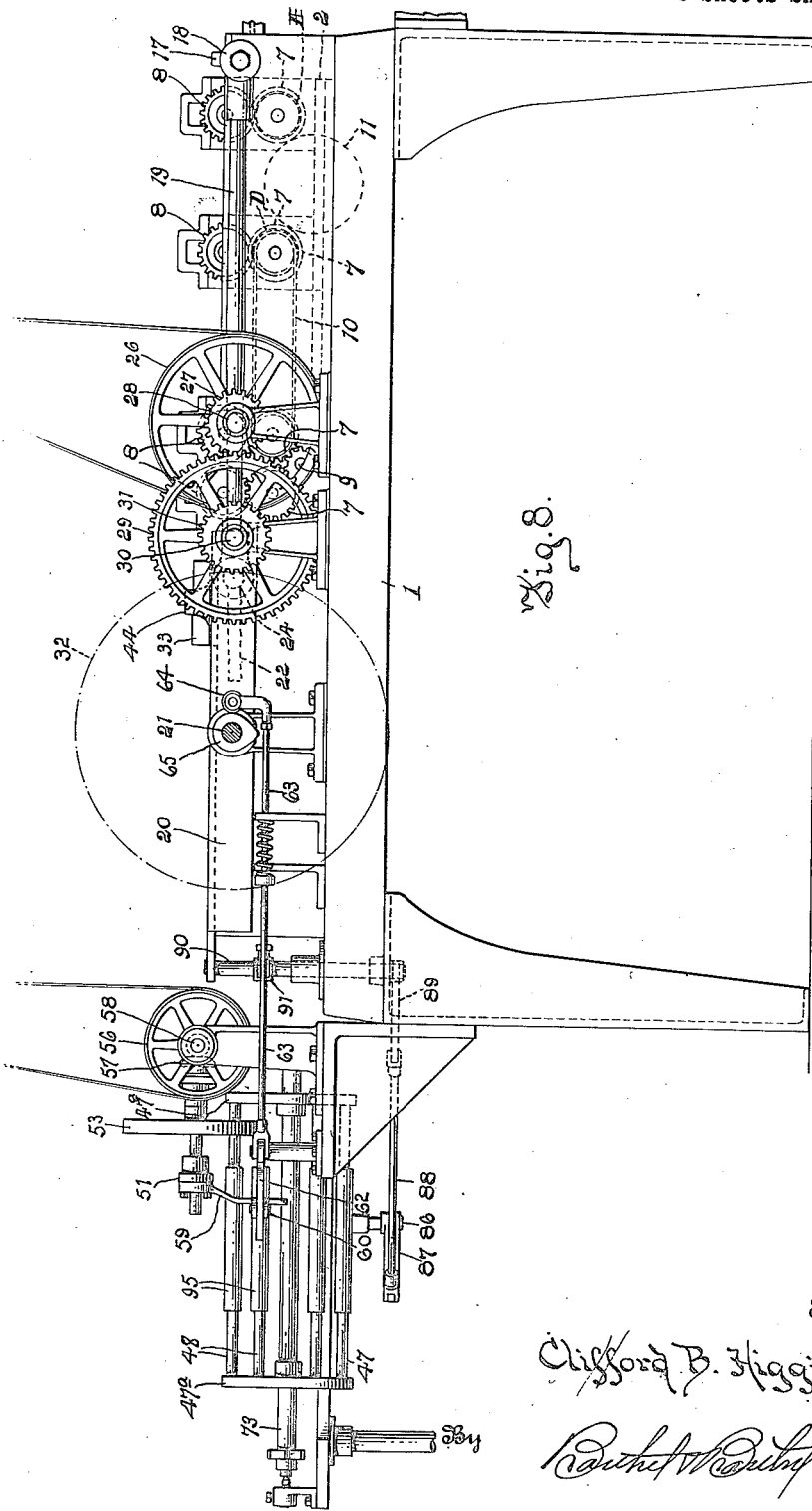
Fig. 8 is an enlarged side elevation of a portion of the machine showing the side thereof opposite that shown in Figs. 3 and 4.
Figure 11:
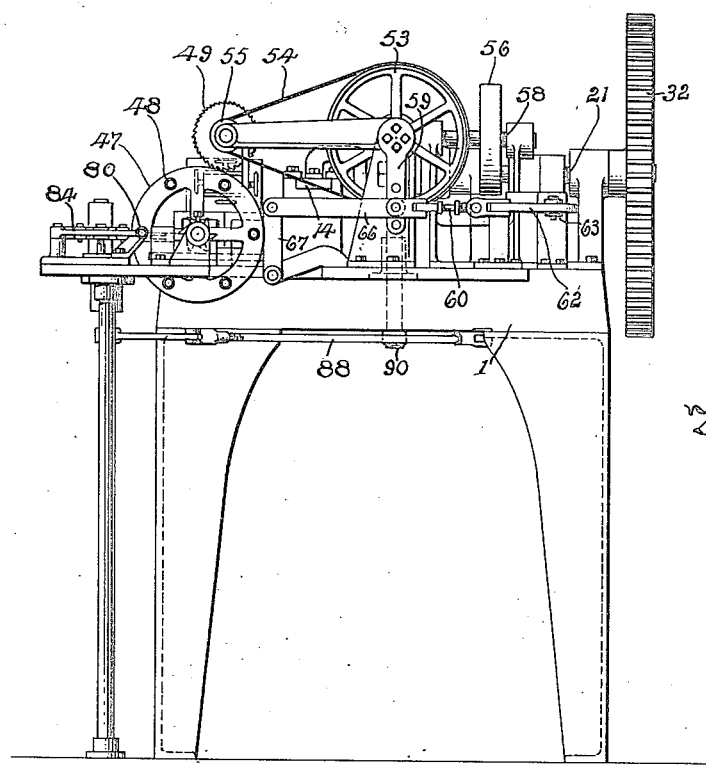
Fig. 11 is an elevation of the rear end of the machine.

Heretofore it has been the practice to form lock-seam tubing from rolls of ribbon metal by passing the ribbon through forming dies and between forming rolls with a continuing movement, the ribbon passing continuously into one end of the machine and out at the opposite end in continuous tube form, the rolls being usually driven rolls for feeding the strip or ribbon with a continuous movement which movement precludes in a machine of simple construction, the drawing of the tube as distinguished from this driving roller feed where the rolls frictionally engage the tube or ribbon to feed it through the machine. Where feed rolls are relied upon, buckling of the tube or ribbon sometimes occurs, causing imperfections while a pulling or drawing operation in which the tube is grasped and pulled through between the rolls and dies, insures perfect formation and uniformity of product, particularly when such rolls are driven simply for the purpose of rolling the ribbon into proper form and not for the purpose of feeding the material through the machine.

In order to secure this pulling or drawing action in a machine of simple construction, the machine embodying the present invention is arranged to operate intermittently, and this intermittent movement permits of bringing into operation, cut-off mechanism during the periods in which the tube is at rest, so that tubes of desired length may be automatically cut from the tube being formed, thus conserving space which would otherwise be required for the continous tube issuing from the machine and also preventing waste of material and facilitating production. This intermittent operation also permits of the employment of swaging means operative in timed relation to the intermittent movement and to the cut-off mechanism, thus providing a machine which will automatically produce finished tubes especially adapted for radiator constructions or similar purposes.

In the accompanying drawings a machine illustrative of an embodiment of the invention is shown, this machine comprising a suitable supporting frame 1 upon which is mounted adjacent one end of the frame, a block 2 forming a bed or support for the several tube forming dies and rollers. These forming instrumentalities may be of any suitable construction and arrangement to form the tubing from a ribbon 3 of metal which is supported upon a spindle 4 carried by a bracket 5 on the rear end of the frame 1. In the construction shown, these forming instrumentalities comprise alternating rolls and dies, the ribbon being guided in the usual manner, first to a pair of forming rolls A which will operate to turn edge portions of the ribbon, as shown at *a* in Fig. 10. From the rolls A the strip passes formers B which further form the edge of the ribbon as shown at *b* in Fig. 10, and then the ribbon passes through a forming die C which bends the ribbon transversely as shown at *c* in Fig. 10. From the die C the strip passes between forming rolls D which further bend the strip transversely, as at *d*, and then by means of a series of forming instrumentalities, indicated at E, the strip is gradually rolled into tubular form as indicated at *e* and *f* in Fig. 10, and the flanged edges of the ribbon interlock, as shown at *g*, *h*. The final tube forming and compressing of the lock-seam is accomplished by means of two pairs of rolls I which form the tube into final shape, as shown at *i* in Fig. 10, with the formed seam pressed inwardly of the tube to provide a tube of smooth exterior. The particular form and arrangement of these forming instrumentalities may be varied as desired, they forming no part of the present invention, but in the particular arrangement illustrated in the drawings, the several rolls A, D, and I are preferably mounted in suitable bearings upon the bed or block 2 and are positively rotated by power applied to their shafts. As shown in Fig. 5, the lower roll of one pair of rolls I is secured upon a driving shaft 6 and on this shaft is also secured a spur gear 7 in mesh with a like gear 8 on the shaft of the upper roll of the pair. The other pair of rolls I is also driven by similar gears 7 and 8 on their shafts, motion being imparted to the lower roll of the pair by an idler gear 9 in mesh with the gears 7.

To drive the pair of rolls D, motion is transmitted thereto from the driving shaft 6 by means of a sprocket chain 10 engaging a sprocket on the drive shaft, and a similar sprocket on the shaft of one of the rolls D. Motion is transmitted from the pair of rolls D to the rolls A by providing a large idler gear 11 to engage the spur gears 7 on the shafts of the lower rolls of each pair, the rolls of each pair being geared together by gears 7 and 8 the same as the rolls I. All of the rolls are therefore power driven to decrease the frictional resistance in drawing the ribbon through the several forming instrumentalities and also to give a better forming action to these rolls than they would have if they were simply idlers, but it is to be understood that this positive drive for the several forming rolls is not for the purpose of feeding the ribbon through the forming instrumentalities as such feeding is accomplished by suitable pulling means hereinafter described.

An intermittent rotation of the drive shaft 6 is secured by providing a gear 12 which is loosely mounted upon the shaft 6 and connected thereto by an overrunning or one-way clutch 13 as shown in Fig. 7, said gear 12 being engaged by a rack bar 14 guided in longitudinal ways 15 carried by the frame adjacent one side of and parallel with the block 2 upon which the several tube forming instrumentalities are mounted. This rack bar 14 is formed with laterally extending longitudinal flanges or ribs 16 to engage with the grooves in the ways 15 and rigidly secured to the rack bar adjacent the forward end thereof is an arm 17 extending laterally from the bar and formed with a horizontal trunnion or pivot pin 18 to which a connecting rod 19 is attached by providing an eye or bearing on the end of the connecting rod to receive the trunnion. The opposite end of the connecting rod 19 is pivotally attached to a crank arm 20 secured to the end of a shaft 21 mounted in suitable bearings upon the supporting frame. The connecting rod or pitman 19 is adjustably and pivotally attached to the crank 20 by forming the crank with an undercut groove 22 in one face thereon to receive the head 23 of the crank pin 24 upon which the pitman turns freely. By loosening the nut 25 which holds the pitman in place upon the crank pin 24, the pin may be adjusted longitudinally of the crank 20 to vary the throw or travel of the pitman. A belt pulley 26 is mounted upon a shaft 27 running in bearings upon the supporting frame and motion is transmitted from this shaft to the shaft 21 by a train of gearing consisting of a pinion 28 on the shaft 27 in mesh with a gear 29 on a shaft 30 mounted in bearings on the frame and provided with a pinion 31 on its outer end to mesh with a large gear 32 secured upon the shaft 21. Any suitable form or construction of one-way clutch 13 may be employed which will act to rotate the shaft 6 when the rack bar 14 is moved by the pitman 19 longitudinally of the machine toward the rear or tube discharge end of the machine, and will permit a free rotation of the gear 12 without transmitting motion to the shaft 6 upon the opposite or return movement of the rack bar. An intermittent rotation of the several forming rolls is therefore secured. As these several forming rolls are not for the purpose of feeding the ribbon 3, means is provided for gripping the tube after it has been formed by the several forming instrumentalities and pulling the tube intermittently, said pulling means comprising a gripper, indicated as a whole by the numeral 33, (see Fig. 9) and which gripper is reciprocated within a longitudinal guide 34 to support and guide the gripper in alignment with the tube issuing from between the rolls I. The gripper 33 comprises a lower block 35 and an upper block 36, which blocks are formed with longitudinal grooves or recesses in their adjacent faces providing an opening through which the tube passes, and the upper block is pressed or forced toward the lower block to grip the tube within this longitudinal passage-way 37 through which the tube extends, by means of a cam member 38 mounted upon a fixed pin or shaft 39 carried by a yoke 40 which spans the block 36 and is bolted at its lower ends to the block 35. This cam member has a cam projection 41 to engage the upper side of the block 36 and is also formed with a stud 42 projecting upwardly from its upper end to be engaged by the forked end 43 of an arm 44 which extends laterally toward the rack bar 14 and is rigidly secured thereto. Upon longitudinal movement of the rack bar toward the rear end of the machine, the cam member 38 will be rocked upon its pivotal support by reason of the loose engagement of the forked end of the arm 44 with the stud 42 which extends upwardly from the cam member and thus the cam projection 41 thereof will be brought into engagement with the block 36 and force this block toward the block 35, firmly gripping the tube therebetween and holding said tube so that it will be pulled or drawn toward the rear end of the machine, thus drawing the ribbon through the several forming instrumentalities.

Upon longitudinal movement of the rack bar in an opposite direction or toward the front end of the machine, the cam member will be rocked on its pivot in a direction to relieve the gripping of the blocks, and thus said blocks will be released from the tube and the said blocks will be slid along their guide ways toward the rolls I, the blocks sliding freely along the tube. The turning movement of the cam member 38 which releases the cam projection 41 from the block 36 is limited by providing a stop member 44$^a$ which is formed integral with the yoke 40 and carries a stop screw 44$^b$ positioned to be engaged by the cam projection 41 immediately upon movement of the rack bar toward the front end of the machine.

A finished tube which is indicated at 45 is intermittently fed from the machine by means of the reciprocating gripper, said tube passing through a suitable straightening die which is indicated as a whole at 46, and a rotary carrier 47 comprising a pair of circular heads 47$^a$ connected by longitudinal tubes 48, is mounted for rotation in any suitable manner upon the frame to bring the several tubes 48 of the carrier into alignment, one at a time, with the straightening die or block 46 so that the tube 45 issuing from the block will pass into a tube 48 of the rotary carrier and when the tube is fully entered in the carrier by the intermittent feeding motion of the gripper 33, cut-off mechanism is automatically brought into operation to sever the formed tube, leaving the severed portion within the tube 48 of the carrier, which carrier is then automatically given a partial rotation to bring its next tube 48 into alignment with the die 46 before the next reciprocation of the rack bar and gripper, and consequent rearward projection of the formed tube through the straightening die 46.

The formed tube 45 is automatically severed in timed relation to the feeding movement of the tube, by a circular saw 49 mounted upon a transverse shaft 50 having bearings in the end of a suitable saw carrying frame 51 which is pivotally supported at one end upon a shaft 52, which shaft is provided with a pulley 53 engaged by a driving belt 54 passing over a small pulley 55 mounted upon the saw shaft 50. Driving power is transmitted to the shaft 52 from a pulley 56, through a pair of beveled gears 57 on the shaft 52 and the shaft 58 upon which the pulley 56 is mounted. With this arrangement the frame 51 may turn upon the shaft 52 without interfering with the belt drive 54 which transmits motion from the shaft 52 to drive the saw 49.

To swing the frame 51 about the axis of the shaft 52 in timed relation to the intermittent feed, and thus lower the saw 49 so that it will engage and sever the formed tube at the proper time, an arm 59 is secured to the frame 51 at its pivot and extends downwardly therefrom. Adjustably connected to this arm 59 is an operating link 60 connecting the arm with one arm of a bell crank lever 62 pivotally mounted upon the supporting frame, and pivotally connected to the other arm of this bell crank is a connecting rod 63 carrying a roller 64 engaged by a cam 65 on the shaft 21, which shaft transmits power for reciprocating the rack bar 14 and for intermittently feeding the formed tube from the machine.

Figure 12:
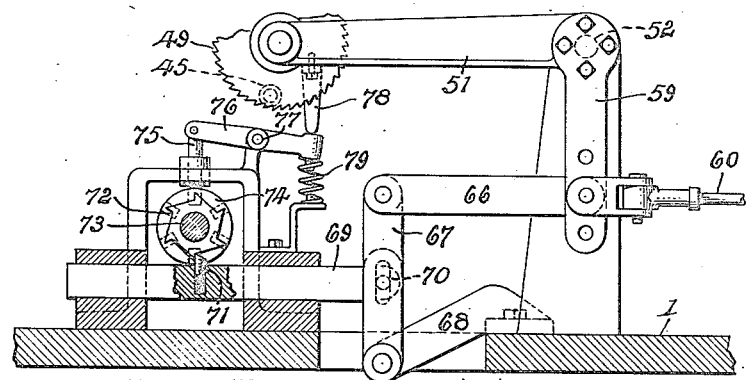
Fig. 12 is a sectional detail of a rotary carrier locking and operating mechanism.
Figure 13:
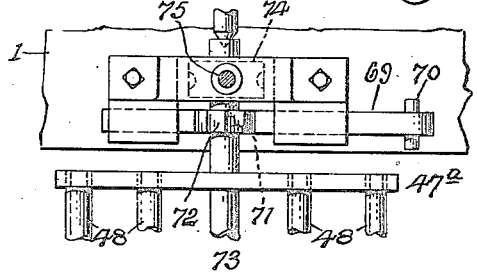
Fig. 13 is a detail showing carrier locking and operating mechanism in plan view.

To intermittently rotate the carrier 47 and bring its tubes 48 successively into alignment with the die block 46 through which the finished tube 45 is pushed, and to lock the carrier with one of its receiving tubes 48 in position to receive the tube 45, automatic feeding and locking mechanism is provided, the feeding mechanism comprising a link 66 (see Fig. 12) pivotally attached at one end to the arm 59 and to the link 60 which operates the same, and at its opposite end to the upper end of a rocker 67 which is pivotally attached to a suitable supporting bracket 68 on the frame and to which rocker 67 is pivotally connected a slide 69 at one end, said slide having a loose connection, as by a pin and slot 70 with the rocker intermediate the ends thereof. This slide carries a spring dog 71 adapted to engage a ratchet wheel 72 secured upon a supporting shaft 73 upon which the carrier 47 is mounted for rotation with said shaft. On the shaft 73 adjacent the ratchet 72 is a disk 74 having radial holes in the periphery thereof corresponding in number to the number of teeth of the ratchet 72 and which holes are adapted to be engaged by a plunger 75 (see Figs. 12 and 13) for locking the shaft 73 against rotation and holding the carrier 47 with one of its tubes 48 in accurate longitudinal alignment with the end of the formed tube 45. The carrier is unlocked by connecting the upper end of the plunger 75 with one end of a rocker bar 76 which is pivoted in any suitable manner, as at 77, upon a fixed support with its opposite end in a position to be engaged by a lug 78 on the frame 51 when said frame is rocked downwardly to bring the saw into operative position. The downward swinging of the frame 51 thus turns the rocker 76 upon its pivot and lifts the plunger 75 out of locking engagement with the disk 74 so that upon the upward swinging movement of the frame 51 the bar 69 may be operated through the connections 66 and 67 to bring its dog 71 into engagement with a tooth of the ratchet 72 and turn the carrier 47 a sufficient distance to bring its next tube 48 into alignment with the end of the tube 45. As the frame 51 is swung upwardly, the lug 78 thereon is lifted away from the rocker 76 and a coiled spring 79 operates upon the free end of the rocker to turn the rocker upon its pivot and engage the plunger 75 with the next opening in the disk 74 when said opening is brought into alinement with the plunger by the turning of the shaft 73.

To produce a tube suitable for assembly with fin plates in a motor vehicle radiator construction where the plates are of very thin material and perforated to receive the tubes, it is essential, in order to prevent injury and distortion of the plates in forcing the tubes through the perforations, that the ends of the tubes be smooth and preferably, that they be so formed as to readily enter the perforations and fit closely within openings in walls of top and bottom tanks. That such tubes may be automatically produced, ready for assembly with their ends properly formed and sized, means is provided for automatically swaging or forming both ends of each tube while it is held in the rotary carrier, said means comprising a pair of cylindrical die members 80 (see Figs. 2 and 4) mounted for longitudinal movement in suitable bearings 81 on the frame adjacent each end of the carrier 47 and into longitudinal alignment with which dies, each tube is brought by the rotation of the carrier and held thereby to be simultaneously engaged by the dies while the carrier is held against turning by its locking plunger 75.

These dies or formers 80 are simultaneously reciprocated in proper timed relation to the rotation of the carrier by means of levers 82 which are pivoted at 83 to the frame and are operated by rods 84 connected to said levers at one end and to opposite ends of a rocker 85 at their inner ends. This rocker 85 is secured to the upper end of a shaft 86 mounted in a bearing in the frame or table and provided with an arm 87 on its lower end, to the free end of which arm is pivotally connected to a rod 88, the opposite end of which is pivotally attached to an arm 89 secured to the lower end of a vertical shaft 90 mounted in suitable bearing on the frame and provided with an arm 91 on its upper end to the free end of which arm a rod 92 is pivotally attached, the opposite end of said rod being operatively connected to a roller 93 (see Fig. 1) engaged by a cam 94 on the shaft 21. Motion is thus transmitted from the shaft 21 for operating the dies 80 and from which shaft motion is transmitted as previously described, for operating the saw and turning the rotary carrier, and therefore said dies are simultaneously moved into engagement with the ends of a section of formed tube, which ends project slightly from the tubular members 48 of the rotary carrier in timed relation to the turning of the carrier, the operation of the saw in severing the formed tube, and the intermittent feeding or projection of the formed tube. These dies 80 may be of any desired form to smooth and form the ends of the tube section, taking off any burr that may be formed thereon by the saw in severing the tube and also preferably contracting said ends very slightly.

Tube sections of the desired length are therefore automatically produced and discharged from the machine, the finished section being ejected from its tubular holder 48 of the carrier, by the projection of the end portion of the formed tube 45 into said holder by the feeding mechanism when that particular holder is brought into longitudinal alignment with the end of said tube by the intermittent rotation of the carrier. Any desired length of tube section may be formed by varying the throw of the crank 20, as by adjusting the crank pin 24 to vary the travel of the rack bar 14 and the feeding movement of the gripper 33, and then lengthening or shortening the carrier 47, by adjusting one of its heads 47ª longitudinally of the carrier shaft 73, such adjustment of the head being permitted by making each tubular holder 48 in sections, one section being secured to each head and the opposed ends of said sections being connected by a sleeve 95 within which the section carried by the adjustable head is free to slide.

The machine embodying the present invention is such as to make it possible to cut the formed tube automatically, into the desired lengths, producing finished tubes ready for assembly with fin plates in a radiator structure or for other uses, thus conserving space required in the production of long lengths and also effecting a great saving in time and material, as when tubes are produced with a continuous movement of the material through the machine, it is necessary to cut the produced tube into long lengths and then cut these lengths into tubes of the desired lengths. When so handled, there is a waste of material in cutting up the long lengths, and additional handling is necessary, causing further loss in time, and material. After cutting into proper lengths, another operation is necessary where it is desirable to finish or swage the ends, but by the employment of intermittently operating feeding mechanism, it becomes feasible to combine in a single, compact and automatically operating mechanism, tube forming mechanism, cut-off means, and swaging devices, all operating in timed relation to produce finished tubes.

Obviously any suitable form of tube forming mechanism, cut-off and end forming means may be employed and such changes as fall within the scope of the appended claims are contemplated.

Having thus fully described my invention, what I claim is:—

1. A machine of the character described and wherein a series of forming instrumentalties are provided for forming a sheet metal ribbon into tube form, continuously operated feed mchanism for intermittently gripping and pulling the ribbon and formed tube through the machine with a step by step movement, and means operating in timed relation to said intermittent feed mechanism for automatically severing the finished tube.

2. A machine of the character described, and wherein a series of forming instrumentalties are provided for forming a sheet metal ribbon into tube form, continuously operated feed mechanism including means for engaging the finished tube and intermittently pulling said tube and ribbon through the machine, tube severing means, and means for automatically operating said severing means in timed relation to said intermittent pulling operation of said feed mechanism.

3. In a machine of the character described and wherein a series of forming instrumentalities are provided for forming a sheet metal ribbon into tube form, intermittently operating feed mechanism for feeding the ribbon and formed tube through the machine with a step by step movement, means for swedging the end of the formed tube, and means for operating said swedging means in timed relation to the intermittently operating feed mechanism.

4. A machine of the character described and wherein a series of forming instrumentalities are provided for forming a sheet metal ribbon into tube form, intermittently operating feed mechanism for feeding the ribbon and formed tube through the machine with a step by step movement, tube severing means, swedging means operative to form both ends of the severed portion of the tube and means for operating said swedging means in timed relation to the intermittently operating feeding mechanism.

5. A machine of the character described and where a series of forming instrumentalities are provided for forming a sheet metal ribbon into tube form, means for feeding said ribbon and tube through the machine with a step by step movement, tube severing means operating in timed relation to said step by step feeding means, a rotary carrier to receive the severed portions of the tube, and means for rotating said carrier in timed relation to said feeding and severing means.

6. A machine of the character described and wherein a series of forming instrumentalities are provided for forming a sheet metal ribbon into tube form, feeding mechanism, tube severing means, a rotary carrier to receive the severed portions of the tube, means for operating the rotary carrier in timed relation to the operation of the severing means for operating the rotary carrier in timed relation to the operation of the severing means, and swedging means for engaging and forming the end of the tube portion carried by said carrier.

7. A machine of the character described and wherein a series of forming instrumentalities are provided for forming a sheet metal ribbon into tube form, intermittently operating feed mechanism for feeding the ribbon and tube through the machine, a rotary carrier to receive the projected end of the finished tube, tube severing means, and means for automatically moving said severing means into operative position and rotating said rotary carrier in timed relation to the intermittent operation of the feed mechanism.

8. A machine of the character described and wherein a series of forming instrumentalities are provided for forming a sheet metal ribbon into tube form, intermittently operated feed mechanism for feeding the ribbon and tube through the machine, a rotary carrier to receive the projected end of the formed tube, severing means for severing the tube, swedging means for engaging and forming the ends of the severed portions of the tube carried by the carrier, and means for operating the severing means, rotary carrier and swedging means in timed relation to the intermittent operation of the feeding mechanism.

9. A machine as characterized in claim 8 and including locking means for the rotary carrier, and means for operating said locking means in timed relation to the intermittent operation of the feeding mechanism.

10. A machine as characterized in claim 8 and including locking means for the rotary carrier, and means operated by the severing means for unlocking said locking means.

11. A machine as characterized in claim 5 and wherein the rotary carrier comprises a series of tubular receiving members carried by adjustable heads.

12. A machine as characterized in claim 5 and including means for rotating the rotary carrier with a step by step movement to bring the tubular holding members of said carrier successively into alignment with the end of the formed tube to receive the same.

13. A machine as characterized in claim 5 and including means for rotating the rotary carrier with a step by step movement, said means comprising a ratchet and reciprocable means to engage and turn the ratchet, said reciprocable means being operated in timed relation to the intermittent operation of the feeding means.

14. A machine of the character described, and wherein a series of forming instrumentalities including pairs of rolls are provided for forming a sheet metal ribbon into tube form, means for gripping the formed tube, and reciprocating means for operating said gripping means and rotating said rolls.

15. A machine as characterized in claim 14 and wherein said reciprocating means includes a rack bar and said gripping means is arranged to grip the tube in one direction of reciprocation of the rack bar only.

16. A machine as characterized in claim 14 and wherein said reciprocating means includes a rack bar, gearing for rotating said rolls including a one way clutch, and wherein said gripping means includes relatively movable gripping members to grip the tube between them and means operative in one direction of reciprocation of the rack bar for moving said gripping members relatively.

17. A machine as characterized in claim 14 and wherein said reciprocating means includes a rack bar, a crank and connecting rod for reciprocating said rack bar, motion transmitting means including gearing and a one way clutch for transmitting motion from said rack bar to rotate said rolls, and said gripping means comprising opposed relatively movable gripping members, a way in which said members are reciprocable, a cam for moving said members relatively, and an arm rigidly secured to said rack bar and operatively connected to said cam.

In testimony whereof I affix my signature in presence of two witnesses.

CLIFFORD B. HIGGINS.

Witnesses:
ANNA M. DORR,
LEWIS E. FLANDERS.